June 26, 1928.

P. J. CLIFFORD 1,675,254

AUTOMATIC TRAIN CONTROL APPARATUS

Original Filed Jan. 5, 1923

Inventor:
Patrick J. Clifford,

Patented June 26, 1928.

1,675,254

UNITED STATES PATENT OFFICE.

PATRICK J. CLIFFORD, OF FALLS, PENNSYLVANIA, ASSIGNOR, BY MESNE ASSIGNMENTS, TO TRAIN CONTROL CORPORATION OF AMERICA, A CORPORATION OF DELAWARE.

AUTOMATIC TRAIN-CONTROL APPARATUS.

Original application filed January 5, 1923, Serial No. 610,880. Divided and this application filed May 17, 1928. Serial No. 278,519.

This case is a division of that filed by me January 5, 1923, Serial No. 610,880, and concerns a specific form of relay connection. The application just mentioned No. 610,880 concerns train control apparatus of the general character disclosed in my application filed April 17, 1922, No. 553,429.

In the accompanying drawings

In these drawings 1, 2 are ordinary rails of the trackway, divided into blocks insulated from each other according to standard practice in signalling systems. The vehicle, which may be considered to be the engine, or engine and tender combined, or any suitable carrier for the apparatus, is or are of standard form.

The relay PR is in an electric connection, such as 3, the terminals of which are in contact with points on the track rails, and in the forms shown the contact is made through the wheels and axles of the vehicle, the said relay being adapted to be operated by the current flowing through this connection due to the drop in potential between the said points, where the wire is in electrical connection through contacts (the ordinary wheels in the example illustrated) on the energized rail.

Figure 1:
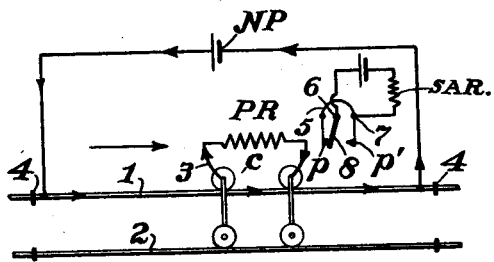
Figure 1 is a diagram of one form of primary relay connection.
Figure 2:
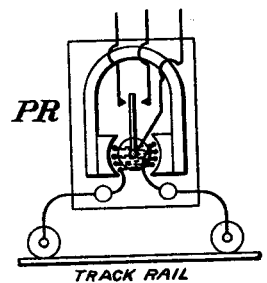
Fig. 2 is a view of the relay more in detail.

As an example of means for energizing the trackway rail, I show in Fig. 1 a battery NP and connections leading therefrom to the ends of the rail of the block, the insulated joints between which and the adjacent block are shown at 4. This relay is polarized, having two contacts $p$, $p'$ electrically connected as at 5, the leads being shown at 6, 7 and the swinging armature at 8 to which the lead 6 is connected. Connection 5 will be omitted as noted hereinafter.

One way of electrically connecting the wire 3 with the track rail system to receive current therefrom is to join the ends of the wire to the upper bearing members or "brasses" in the journal boxes of the ordinary axles of the vehicle, so that these bearings, the wheel journals and the wheels will be in this circuit, though I do not limit myself in this particular, it being obvious, however, that it is of material advantage to provide such a connection as will not require alteration of standard equipment, but will only entail connection therewith or mounting thereon.

As just stated above, the vehicle is of standard form with ordinary axles, and therefore, as set forth in my application Serial Number 610,879, no insulation of wheels, axles or other parts of the standard equipment is employed, and by reason of taking the current through the ordinary bearing members or brasses of the journal boxes I avoid the use of collector rings and brushes which by their frictional contact will generate current which will unduly affect the primary relay.

The relay PR is responsive to the presence or absence of a prescribed current in the track rail system and it is responsive also to the changes in polarity of the current received from the track rail system. This prescribed current may be that of the wayside signal system or it may be a current imposed on the track rail system where no wayside signal system is employed or it may be that which is imposed on the track rail system in addition to that used for operating the signal system. In other words, the relay may be calculated to pick up the prescribed current and to remain unaffected by the signal current or by current generated dynamically from the running gear. The change in polarity of the current through the relay will result from changes in polarity of the circuit in the track rail system such as may be made to secure an advance signal indication in the engineer's cab, or for responding to change in the polarity of the track rail system circuit under other circumstances.

This primary relay may be used to control signals in the cab corresponding to ordinary wayside block signals, and in addition it may cooperate to control advance caution signal indications, and these cab signals may be used either with or without the wayside signals. The primary relay is also used to control train stop apparatus on the train and this function may be performed alone or in conjunction with the cab signals. The primary relay preferably exerts its control upon apparatus carried by the vehicle through a slow acting relay SAR to take care of any momentary deenergizing of the primary relay due to crossing the insulated rail joints or due, for instance, to sand on the track rail system temporarily interrupting the circuit, or to take care of the reversing of the primary relay due to a change in the polarity of the current. The control exerted by the primary relay is continuous, it being in electrical connection with the track rail system of the block constantly, the track rail system being of standard type with the rails electrically continuous from end to end of the block.

In Fig. 1 the primary relay PR is in a connection 3 on one side of the vehicle and with points spaced apart along one rail.

In each of the above figures the coil of the relay is shown at $c$. The relay may be of the Depre D' Arsonval type for direct current with polarized action of its armature or armatures, and closing on its contacts on potential say, for instance, above plus or minus 1.5 millivolts. The current imposed on the track rail system may be, say, 7 amperes, though it will be understood that these figures may be varied. As in my previous application, the energized primary relay, when energized by the prescribed current, will hold the train stop apparatus in condition with the brakes off and upon the absence of said prescribed current the primary relay will assume neutral position, resulting in the brakes being applied.

In so far as the apparatus on the vehicle is concerned, this may be like that disclosed in said application, both as regards train stopping means and also signaling means, and this is true also of the various circuits. In other words, the subject matter of said application is to be regarded as illustrating how the relay herein may be utilized and this may be regarded as a part of this specification.

Where the range in polarity of the prescribed current is to be utilized, for instance, in getting an "advance" signal indication the electrical connection at 5 between the points $p$ $p'$ will be omitted, see in this connection my application No. 610,879 filed Jan. 5, 1923.

It does not appear necessary to illustrate herein all the mechanism which is controlled by the primary relay, it being thought sufficient to indicate the slow acting relay as representative of any mechanism which may be used and which when energized will hold the brakes off, and will cause the setting of the brakes in the absence of said prescribed current in the primary relay.

I claim:

The combination of a vehicle track, a trackside circuit including an electrically continuous portion of one rail of the track, means for supplying electrical current in either direction in said circuit, and a vehicle equipment including a vehicle-carried partial circuit connected at its terminals to the said rail in parallel with said portion of the rail, and a polarized device operable by the flow of current in opposite directions in said vehicle carried circuit to obtain different controlling conditions.

In testimony whereof, I affix my signature.

PATRICK J. CLIFFORD.